…

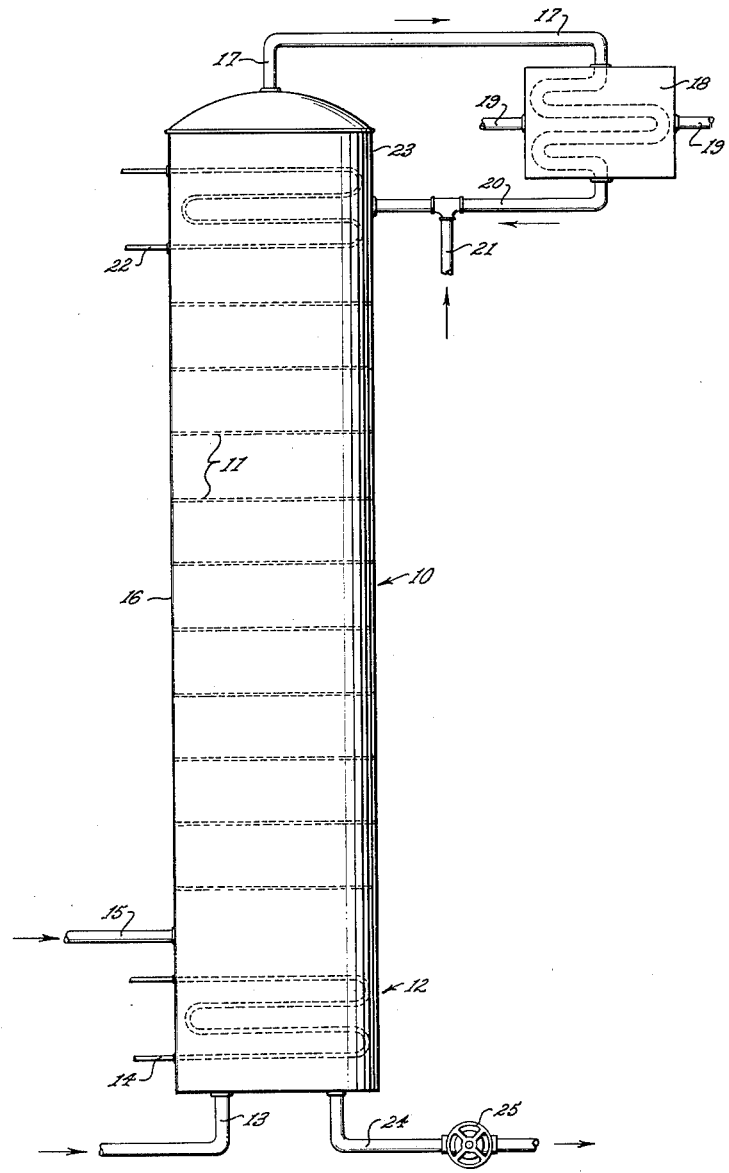

United States Patent Office 3,046,307
Patented July 24, 1962

3,046,307
DISTILLATION PROCESS FOR SYNTHESIZING UREA
Julius H. Bochinski, La Habra, Calif., assignor to The Fluor Corporation, Ltd., Los Angeles, Calif., a corporation of California
Filed Apr. 5, 1957, Ser. No. 651,073
11 Claims. (Cl. 260—555)

This invention has to do with the synthesizing of urea carbon dioxide and ammonia, and has for its general object to provide an improved process characterized by its capacity to produce yields of urea in excess of 93 percent per pass of the reactants, under ordinary operating temperatures but at pressures and ammonia to carbon dioxide ratios which are much lower than those required in present commercial processes.

According to present commercial methods, urea is synthesized by reaction of ammonia and carbon dioxide at elevated pressures and temperatures and in a manner aimed at obtaining high conversions of the reactants per pass through the reactor at stoichiometric ratios, yields of about 45 to 50% result. Higher urea yields per pass may be obtained by employing larger ammonia to carbon dioxide ratios. The higher the ammonia to carbon dioxide ratio, the higher the pressure has to be to keep the reactants in the liquid phase so that the urea can be formed. At ammonia to carbon dioxide ratios of 6 to 1 and pressures of about 3600 p.s.i., and reactor outlet temperatures of about 350° F., the conversion of carbon dioxide to urea is about 75 to 80% per pass.

Ordinarily it is necessary to recover the unconverted ammonia from the effluent and then recycle it to the reactor. When the ammonia and carbon dioxide are fed to the reactor in stoichiometric proportions with the resulting 45 to 50% conversions, considerable amounts of ammonia and carbon dioxide have to be recycled to the reactor. This recycle step is complicated by the fact that ammonia and carbon dioxide readily form solid ammonium carbamate at lower temperatures. In one commercial method, ammonia and carbon dioxide are condensed to solid ammonium carbamate and suspended in oil and pumped back to the reactor. In other processes, ammonia is separated from the carbon dioxide by selectively absorbing the carbon dioxide from the vapor mixture and recompressing and recycling the pure ammonia.

To reduce the size of the costly ammonia and carbon dioxide separation steps, some commercial processes feed excess ammonia to the urea reactor to increase the yield per pass which results in less carbon dioxide in the reactor effluent and reduces the size of the ammonia and carbon dioxide separation plant. The ammonia recovery and recycle steps would then consist of a distillation unit to separate the pure ammonia from the reactor effluent, a flash step to decompose the unconverted ammonium carbamate to ammonia and carbon dioxide vapors, and a reboiled absorber employing a solvent to separate the carbon dioxide from the ammonia.

The present invention is predicated upon achieving high urea yields per pass of the reactants and at desirably low pressures and low ammonia to carbon dioxide ratios, by the use of a distillation type process involving a simply system permitting of easy and accurate control of the reactant and all operating conditions to obtain high urea yields. Essentially, the system comprises the simple combination of a reaction zone within which carbon dioxide and ammonia undergo reaction in the presence of water to form ammonium carbamate, and in which some of the carbamate reacts to form urea, a condensing zone in which the reaction zone overhead consisting principally of ammonia is cooled or condensed to be returned with added ammonia to the reaction zone, and a stripping or reboiler zone which receives the carbamate and urea formed in the reaction zone and into which ammonia is fed to cause, together with heating, conversion of the carbamate to urea which is withdrawn in aqueous solution from the stripping zone.

While it is contemplated that the process as thus characterized may be carried out in any suitable structural arrangements defining the reaction, condensing and stripping zones, it is desirable in the interests of economy and simplicity in the vessel fabrication and arrangement, to employ a single distillation column having a bottom stripping or reboiling section, and an outside condenser which may constitute all or a portion of the total condensing zone.

The process contemplated by the invention will be understood more fully from the following detailed description throughout which reference is had to the accompanying drawing which is illustrative of a preferred form of distillation equipment for effecting the reaction, condensing and stripping stages of the process.

Referring to the drawing, the distillation column generally indicated at 10, may be of any suitable type adapted to promote intimate contact and reaction between liquid and gas or vapor phase flowing countercurrently, and respectively downwardly and upwardly within the column. The latter may be provided with such liquid and gas contacting means as conventional bubble trays or perforated plates 11, or the column may contain instead any of the usual forms of so-called packing which presents extended surfaces for division and contacting of the liquid and gas. The bottom section 12 of the column forms a stripping or reboiler zone to which ammonia is fed through line 13 and within which the contents may be heated as by coil 14. Carbon dioxide is introduced to the column through line 15 above the stripping zone and at the bottom of the vertically extending reaction zone 16 occupying the intermediate extent of the column. The reaction zone overhead gas and vapors flow through line 17 to a condenser 18 having cooling fluid connections 19, and from which the cooled stream is returned to the column through line 20. As will later appear, ammonia, or an ammonia-containing stream, is added to the cooled condenser effluent, through line 21. If desired, the total overhead cooling may be supplemented by cooling directly within the top section of the column as by the cooling coil 22. Accordingly, it will be understood that when coil 22 or its equivalent is used, the total cooling or condensing zone includes the top section 23 of the column, as well as the condenser 18.

During the course of their upward flow within the reaction zone, and particularly within its upper somewhat cooler extent, a portion of the ammonia and carbon dioxide introduced through lines 13 and 15 combine in the reactor to form ammonium carbamate in aqueous solution by exothermic reaction and with consequent temperature increase. Simultaneously within the reaction zone, some reaction or dissociation of the carbamate occurs, with the resultant formation of urea and water. The ammonia and carbon dioxide reaction is complete to the extent that the column overhead flowing to the condenser through line 17 will consist essentially of ammonia, with possibly small amounts of carbon dioxide and some water vapor present. The cooling effect of the coil 22, if used, and the condenser 18 produces condensation of all or most of the column overhead so that the return as reflux to the reaction zone through line 20, consists essentially of condensate containing ammonium carbamate. To this stream is added an ammonia-containing stream in line 21, which may be aqueous ammonia and which may or may not contain ammonium carbamate. This supplement may be derived from any suitable source, such as recycle from that portion of the plant, not shown, in which the product urea may be purified. Since such a plant is a practicable source of aqueous ammonia (e.g. 50–80% ammonia in water), this purification plant effluent ordinarily will also contain some ammonium carbamate, which thus becomes retained in the system as a whole, for ultimate conversion to urea.

Upon flowing downwardly through the stripping zone 12, the aqueous ammonium carbamate and urea is contacted by the countercurrently flowing ammonia introduced through line 13, the partial pressure effect of which is to produce dissociation of the carbamate to carbon dioxide and ammonia, leaving in the stream going to the discharge line 24 a high percentage urea yield corresponding, as previously indicated, to at least the equivalent of 93 percent of the carbon dioxide fed to the system through line 15. To promote conditions to the extent desired in the stripping zone, the latter may be so designed or vertically extended as to constitute from say 1 to 3 theoretical or equilibrium stages.

Concerning operating conditions, the reaction zone pressure, which is substantially the same in the condensing and stripping zones, may be maintained in the range of about 900 to 2000 pounds p.s.i. absolute, the range between about 1500 and 1700 pounds being preferred. The liquid temperature in the stripping zone 12 is maintained between about 330 and 400° F., the range of about 370° F. to 385° F. being preferred. Generally speaking, the condensing zone temperature may range between about 200° F. to 330° F., depending on the water content of the reaction zone overhead. To illustrate, with about 8% water the temperature should be not less than in the neighborhood of 176° F.

The mole ratio of fresh ammonia fed to the stripping zone through line 13, to the product urea withdrawn therefrom through line 24, may be within the range of from 0 to 1, to 10 to 1, and preferably in the range of 1.8 to 1 to 3.5 to 1. The carbon dioxide fed to the system through line 15 is governed by the following considerations: The system will operate at its minimum pressure for a given reaction zone outlet temperature when the ammonia and carbon dioxide are in the stoichiometric ratio of 2 moles of ammonia to 1 mole of carbon dioxide. It is found that the conversion of ammonium carbamate to urea in the reaction zone can be increased by increasing the ratio of 2 moles of ammonia to 1 mole of carbon dioxide in the vapor phase, by a few percent. Also, by operating the condensing zone between the temperatures of about 220° F. and 330° F. within the pressure range of 900 to 2000 pounds, and particularly within the 1500 to 1700 pound range, it is possible to recover ammonia that is essentially free of carbon dioxide.

It is contemplated that the ammonia added to the condenser overhead may be introduced in advance of or beyond the condenser. Where introduced as aqueous ammonia, the added stream does not require cooling and may be introduced, as illustrated, beyond the condenser. The quantity of ammonia thus introduced will generally correspond to the amount of dissolved ammonia content of the effluent discharged through line 16, and which has been taken from the vapor phase in the reaction zone by dissolution in the carbamate solution. In general, the quantity of ammonia thus introduced, to give minimum condenser pressure at a given condenser temperature should be such that the vapor prior to condensation has an $NH_3$ to $CO_2$ ratio of at least about 3.7 to 1.

The aqueous product urea withdrawn from the stripping zone through line 24, may be subjected to treatment by any of the known methods commercially employed for the purification and recovery of solid urea. As previously indicated the recovery treatment may be productive of aqueous ammonia, or ammonia and carbamate solution, which may be recycled in proper quantity to line 21.

To cite a specific example of conditions under which the process may operate, a column 10 containing in its reaction zone five theoretical or equilibrium stages, and a stripping zone containing three similar stages, is maintained under pressure of 110 atmospheres. Ammonia is fed to the stripping zone at the rate of 330 moles per hour, and carbon dioxide is fed to the bottom of the reaction zone at the rate of 165 moles per hour. Within the stripping zone the liquid temperature ranges at the top from 350° F. to 380° F. at the bottom, and in the reaction zone the bottom temperature ranges from 350° F. to a top temperature of 368° F. The column overhead containing 700 moles per hour of ammonia, with traces of carbon dioxide and water, is cooled in the condensing zone to a temperature of about 270° F. To the condensate is added aqueous ammonia at the rate of 130 moles and 100 moles respectively of ammonia and water per hour. The product stream withdrawn through line 24 and depressurized past the valve 25 contains hourly moles of the following: ammonia 130, water 256, urea 156 and ammonium carbamate 8.9.

I claim:

1. The process for synthesizing urea that includes feeding ammonia into a stripping zone for upward flow therein into a reaction zone, feeding carbon dioxide into the lower portion of the reaction zone for admixture with ammonia from the stripping zone and flowing the carbon dioxide and ammonia upwardly in the reaction zone and countercurrently to an aqueous stream containing ammonium carbamate and urea, reacting the carbon dioxide and ammonia in the upper portion of the reaction zone to form said ammonium carbamate and urea, passing said stream downwardly through said stripping zone countercurrently to the ammonia introduced thereto to decompose the carbamate to carbon dioxide and ammonia, and vaporization of some water for passage with the ammonia fed into the reaction zone, passing an overhead stream of unreacted carbon dioxide, ammonia and water vapor from said reaction zone into a condensing zone and returning to the reaction zone substantially all the cooled stream including ammonium carbamate formed by the cooling so that such carbamate is carried by the down-flowing liquid stream in the reaction zone, heating the stripping zone to supplement the effect of the ammonia in promoting decomposition of carbamate to carbon dioxide and water, maintaining the reaction and stripping zones at substantially the same pressure, and withdrawing the urea from the stripping zone.

2. The process as defined by claim 1, in which the reaction zone directly overlies and is in open pressure equalizing communication with the stripping zone.

3. The process as defined by claim 1, in which ammonia is added to said overhead stream.

4. The process as defined by claim 1, in which ammonia and ammonium carbamate are added to said overhead stream.

5. The process as defined by claim 1, in which ammonia is added to said overhead stream after its passage through the condensing zone.

6. The process as defined by claim 1, in which both the ammonia introduction and urea withdrawal occur at substantially the bottom of the stripping zone.

7. The process as defined by claim 1, in which the stripping, reaction and condensing zones all are maintained under substantially the same pressure.

8. The process as defined by claim 1, in which the stripping, reaction and condensing zones all are maintained under substantially the same pressure between about 900 to 2000 pounds per square inch, the temperature of said stripping zone is between about 330° F. and 410° F., and the temperature in said condensing zone is between about 200° F. and 330° F.

9. The process as defined by claim 8, in which the mole ratio of ammonia introduced to the stripping zone, to the urea withdrawn therefrom, is between 0 to 1, to 10 to 1.

10. The process as defined by claim 8, in which the mole ratio of ammonia to carbon dioxide in the vapor within the reaction zone is between 1 to 1 and 3 to 1.

11. The method as defined by claim 8, in which the ammonia and carbon dioxide are reacted to a degree of completeness that the urea withdrawn from the stripping zone is equivalent to at least 93% of the carbon dioxide introduced to the reaction zone.

References Cited in the file of this patent

UNITED STATES PATENTS

| | | |
|---|---|---|
| 1,937,116 | Hetherington | Nov. 28, 1933 |
| 2,056,283 | Lawrence et al. | Oct. 6, 1936 |
| 2,212,847 | Porter | Aug. 27, 1940 |
| 2,214,068 | Rogers et al. | Sept. 10, 1940 |
| 2,701,262 | Cook | Feb. 1, 1955 |
| 2,848,493 | Dewling et al. | Aug. 19, 1958 |

OTHER REFERENCES

Tonn: Chem. Engineering, (October 1955), (pages 186–190).